J. C. LIGHTHOUSE.
WHEEL.
APPLICATION FILED MAR. 30, 1907.

969,886.

Patented Sept. 13, 1910.

2 SHEETS—SHEET 1.

WITNESSES:
Clarence W. Carroll
D. Gurnee

INVENTOR:
John C. Lighthouse
by Odgen & Davis
his attys

J. C. LIGHTHOUSE.
WHEEL.
APPLICATION FILED MAR. 30, 1907.
969,886.
Patented Sept. 13, 1910.
2 SHEETS—SHEET 2.
FIG.7.
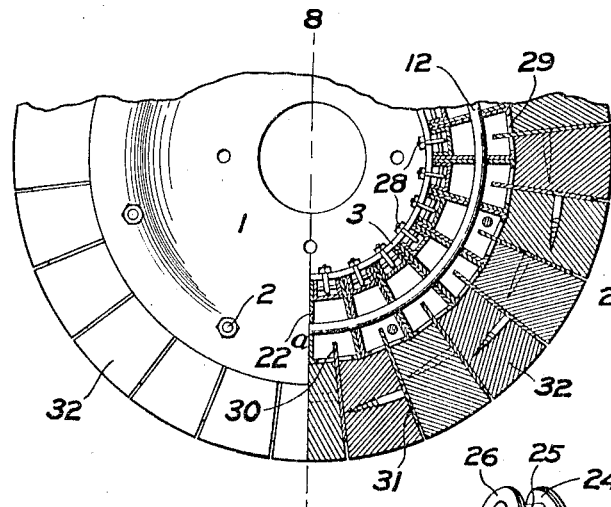
FIG.8.
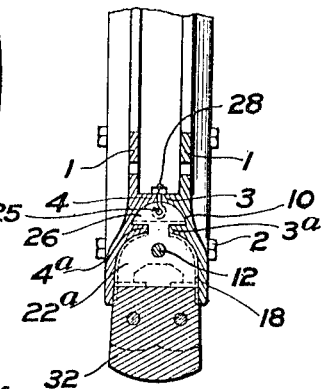
FIG.11.
FIG.9.
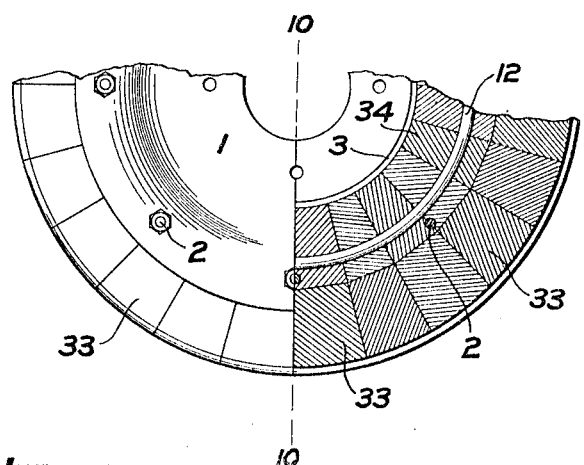
FIG.10.
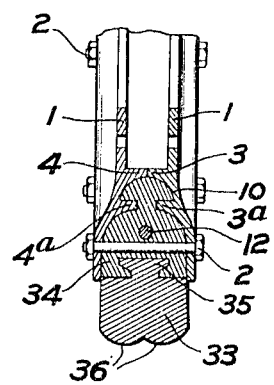
WITNESSES:
Clarence W. Carroll
D. Gurnee.
INVENTOR:
John C. Lighthouse
by Offield & Davis
his Attys

UNITED STATES PATENT OFFICE.

JOHN C. LIGHTHOUSE, OF ROCHESTER, NEW YORK.

WHEEL.

969,886.  Specification of Letters Patent. Patented Sept. 13, 1910.

Application filed March 30, 1907. Serial No. 365,596.

*To all whom it may concern:*

Be it known that I, JOHN C. LIGHTHOUSE, a citizen of the United States, and resident of Rochester, in the county of Monroe and State of New York, have invented certain new and useful Improvements in Wheels, of which the following is a specification.

This invention relates to wheels, and consists in the construction and combination of the elements herein described and claimed.

Figure 1:
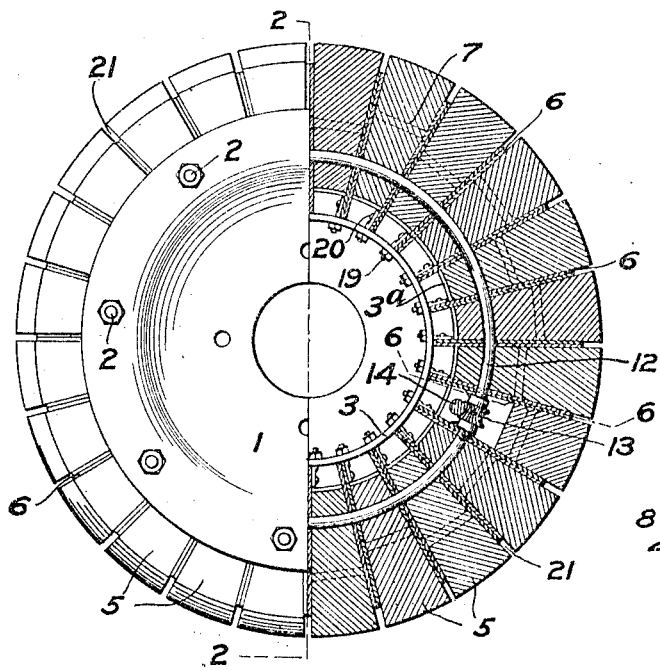
Figure 2:
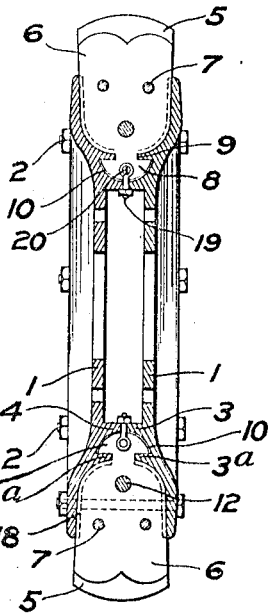
Figure 3:
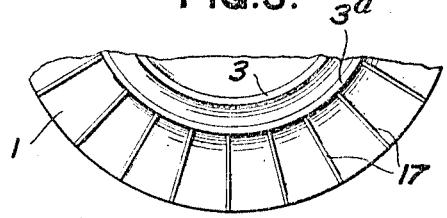
Figure 6:
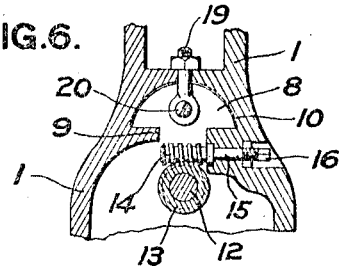
Figure 4:
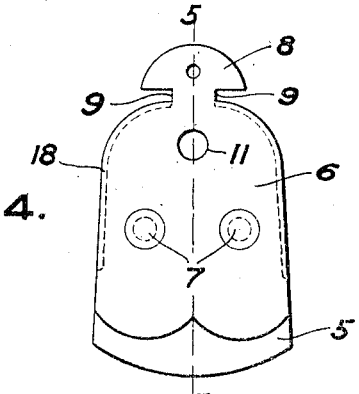
Figure 5:
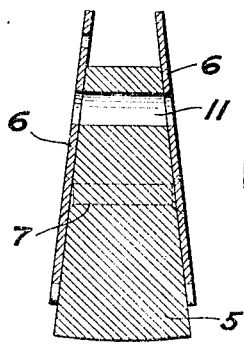

In the drawings:—Figure 1 is a side view of a wheel constructed in accordance with this invention, partly broken away to show interior construction; Fig. 2 is a section on line 2—2 of Fig. 1; Fig. 3 is an elevation of the inner face of a portion of one wheel center; Fig. 4 is an enlarged elevation of one tire-section; Fig. 5 is a section on line 5—5 of Fig. 4; Fig. 6 is an enlarged cross-section on line 6—6 of Fig. 1; Fig. 7 is a view similar to Fig. 1, showing a modified form of wheel; Fig. 8 is a section on line 8—8 of Fig. 7; Fig. 9 is an elevation similar to Fig. 1, illustrating another modification; Fig. 10 is a section on line 10—10 of Fig. 9; and Fig. 11 is a perspective view of a detail.

The wheel centers 1, 1 are usually of cast iron or like material, adapted to be fastened together by bolts 2. A circular rib 3 on one center touches a corresponding rib 4 on the opposite center, and thus the said centers can be drawn together only to a certain limit. Circular ribs or lugs 3ᵃ and 4ᵃ, curved or rounded on their outer faces to form a tire-socket, extend around the wheel centers outside of the ribs 3 and 4.

The tire or wheel tread is made in sections, and as shown in Figs. 1, 2, 4, and 5, these sections are of equal size and are radial. Each section consists of a block 5 of leather, rubber, rawhide, or any other compressible material adapted for use as a tire, having a metal plate 6 on each radial side. Rivets or countersunk screws 7 fasten the plates solidly to said blocks. In Fig. 4 the form of the plates 6 is clearly shown. The inner ends 8 thereof are semicircular, and notches 9 are cut under said ends. Grooves 10 in the wheel centers are formed to receive accurately the plates 6 and the semicircular heads 10, and thereby hold the tire-sections firmly in position. In order to fasten the tire-sections still more firmly together, a hole 11 is drilled in each, and a circular bolt or rod 12 is passed through the entire set. The said rod may be sufficiently pliable to permit its being sprung open to place the sections upon it. After the last section is in place, the ends of the rod are brought together and tightened by means of a right-and-left nut 13 thus forcibly contracting all the tire sections upon the wheel, compressing the contiguous surfaces of the blocks 5, and making the whole series of tire blocks a solid tire mass. The nut 13 may, for convenience, be toothed on the outside, and adapted to be turned by a worm 14, which is journaled in a proper point of one wheel center. (Fig. 6.) The shaft 15 of said worm may project to the outside of the wheel center and have on it a squared end 16 to fit a socket-wrench or key.

It will be understood that the tire sections are placed on one wheel-center before the other wheel-center is bolted thereto, and are not removable when the structure is complete, as in Figs. 1 and 2, etc.

To prevent the blocks 5 from sliding between the wheel-centers circumferentially, radial ribs or lugs 17 are formed on the inner face of each wheel-center, (Fig. 3). These enter grooves 18 in the blocks 5. An additional preventive of slip may also be provided, such as bolts or studs 19, each of which is fastened by a screw 20 to one plate 6, and extends inwardly through recesses in the ribs 3 and 4. The nut on each of said bolts is tightened against the inner face of one rib.

The blocks 5, when new, are preferably fastened between the plates 6, so as to project beyond the ends thereof, and when so made, a gap or interstice 21 will occur between every two blocks. As the wheel is used, the material in the blocks 5 will, on account of its resilience, become crushed or compressed to some extent, and in a short time will fill up the spaces 21, and the tread or tire-face will then be a continuous unbroken surface. The tread may be of any desired form, corrugated, flat, or rounded, &c. In Figs. 7 and 8 is shown a form of wheel in which the tire-sections are more readily removable for renewal; they may, in fact, be removed without taking the right-and-left nut 13 off the rod 12.

The inner member of each section is a metal plate 22, bent as shown in Fig. 11, so as to form two converging sides 22ᵃ and a connecting portion 23. A spacer 24 is fastened by a rivet 25 between the semicircular heads 26 of the sides 22ᵃ, and the plate 22 is thus a solid structure. Holes 27 permit the passage of the rod 12 through the whole set of plates, and hook-bolts 28 may be used in the same manner as the bolts 19 previously described. In the flat transverse portion 23 is a slot 29, adapted to receive a T-shaped head 30 on a plate 31. The plate 31, when placed as shown in Fig. 11, cannot be separated from the plate 22, but when turned one quarter around, the T-head 30 will aline with the slot 29, and said plate may be readily detached. The tire blocks 32 are each fastened to one plate 31, and said plate and block, together with a plate 22, constitute one tire-section.

The removal of a block 32 from the set may be done as follows:—After taking off one of the wheel-centers all the tire sections may be lifted together from the opposite wheel-center, and the rod 12 loosened somewhat; then the section which is to be removed is swung around on said rod, in a plane at right angles to the flat sides of the wheel, until clear of all other sections. Any block 32 and plate 31 may then be turned 90 degrees, or until the T-head 30 is in line with the slot 29, and said block and plate may then be pulled out. A new block may be inserted by reversing the process.

In the modification shown in Figs. 9 and 10, the tire sections consist of solid blocks 33 of resilient material, dovetailed into blocks 34 which fit the grooves 10 and the tire socket in the wheel-centers 1. A circular rod 12 passes through all the blocks 34, as in the former case. The blocks 33 have T-shaped or beveled heads 35 which engage correspondingly shaped grooves in the blocks 34. The blocks 33 are removable in practically the same manner as the blocks 32 just described, but instead of turning them a quarter-revolution, they may be simply moved sideways out of the groove engaging the T-head 35. The tread or tire face in this modification is shown as a double-curve 36, Fig. 10, which form has been found to prevent skidding to a great extent.

What I claim is:—

1. The combination of separable plates, together constituting a tire socket having a groove at the bottom thereof; tire sections fitting in said socket and groove, each having a plate extending into said socket and groove and a tire block attached to said plate and projecting from said socket; and means for forcibly contracting the set of tire sections against each other and toward the center of the wheel.

2. The combination of separable plates, together constituting a tire socket having a groove at the bottom thereof, radial ribs on the plates in said socket; tire sections fitting in said socket and groove, each having a plate extending into said socket and groove and a tire block attached to said plate and projecting from said socket; and means for fastening a series of said sections to each other.

3. The combination of separable plates, together constituting a tire socket having a groove at the bottom thereof, which is reduced in dimensions at the point of connection with said socket portion; tire sections fitting in said socket and groove, each having a plate adapted to fit in said socket and groove and a tire block attached to said plate and projecting from said socket; and means for forcibly contracting the set of tire sections against each other and toward the center of the wheel.

4. The combination of separable plates, together constituting a tire socket having a T-shaped groove at the bottom thereof; tire sections each having a plate provided with a T-shaped head, and fitting in said socket and groove and a tire block attached to said plate; and means for forcibly contracting the set of tire sections against each other and toward the center of the wheel.

5. The combination of separable plates, together constituting a tire socket having a groove at the bottom thereof; tire sections fitting in said socket and groove, each having a plate extending into said socket and groove and a tire block attached to said plate and projecting from said socket; a circular rod passing through said sections; and means for tightening said rod for forcibly contracting the set of tire sections against each other and toward the center of the wheel.

6. The combination of separable plates, together constituting a tire socket having a groove at the bottom thereof, radial ribs on the plates in said socket; tire sections fitting in said socket and groove, each having a plate extending into said socket and groove and a tire block attached to said plate and projecting from said socket; a circular rod passing through said sections; and means for tightening said rod for fastening the series of sections to each other.

7. The combination of separable plates, together constituting a tire socket having a groove at the bottom thereof, which is reduced in dimensions at the point of connection with said socket portion; tire sections fitting in said socket and groove, each having a plate adapted to fit in said socket and groove and a tire block attached to said plate and projecting from said socket; a circular rod passing through said sections; and means for tightening said rod for forcibly contracting the set of tire sections against each other and toward the center of the wheel.

8. The combination of separable plates, together constituting a tire socket having a T-shaped groove at the bottom thereof; tire sections each having a plate provided with a T-shaped head, and fitting in said socket and groove and a tire block attached to said plate; a circular rod passing through said sections; and means for tightening said rod for forcibly contracting the set of tire sections against each other and toward the center of the wheel.

JOHN C. LIGHTHOUSE.

Witnesses:
L. THON,
D. GURNEE.